United States Patent

[11] 3,593,112

[72] Inventors John C. Coats;
George W. Wilson, III, both of Garland, Tex.
[21] Appl. No. 887,127
[22] Filed Dec. 22, 1969
[45] Patented July 13, 1971
[73] Assignee Varo, Inc.
Garland, Tex.

[54] SOLID-STATE AC POWER CONTROL APPARATUS
10 Claims, 6 Drawing Figs.
[52] U.S. Cl. .................................. 323/24,
307/252.21, 307/252.73, 307/305, 323/31, 323/34
[51] Int. Cl. .................................. G05f 1/44
[50] Field of Search .................................. 321/5;
307/252.21, 252.73, 305; 323/22 SC, 24, 4, 9,
16—22, 31, 34

[56] References Cited
UNITED STATES PATENTS
3,044,007 7/1962 Akers .......................... 323/22 (V)
3,354,377 11/1967 Leeds, Jr. ...................323/22 X (SCR)
3,452,214 6/1969 Martin.........................307/252 (.73) X
3,491,283 1/1970 Johnston ....................323/22 X (SCR)
3,504,265 3/1970 Toulemonde ................ 321/5

Primary Examiner—Gerald Goldberg
Attorneys—Harvey G. Lowhurst and Claude A. S. Hamrick ABSTRACT: A solid-state AC power control circuit intended for use with digital computers and which can increase or decrease, and turn on or turn off the AC power supplied to a work load in response to the application of computer generated electrical signals to the proper input terminal. The amount of power change is determined by certain characteristics of the signals and the RC time constant of a memory circuit in the device. In addition to input terminals for receiving power increase and decrease input signals, two other input terminals are provided for allowing the controlled power to be turned full off or back on to a preset level by the computer without disturbing the memory circuit.

INVENTORS
JOHN C. COATS
GEORGE W. WILSON III
BY
ATTORNEY

INVENTORS
JOHN C. COATS
GEORGE W. WILSON III
BY
ATTORNEY

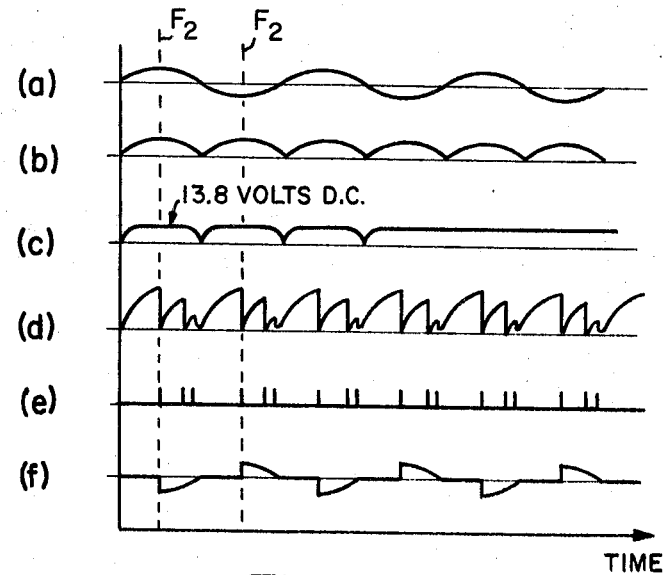
Fig_5
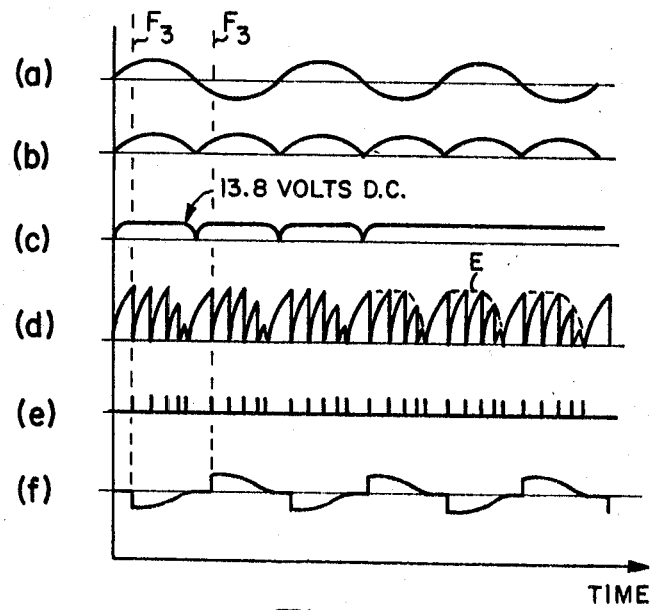
Fig_6

SOLID-STATE AC POWER CONTROL APPARATUS

BACKGROUND OF THE INVENTION

The present invention relates generally to AC power control apparatus and, more particularly, to a novel solid-state AC power control apparatus for use with digital computers and the like.

The continuous growth of the application of electrically operated equipment in a vast number of fields has focused attention not only upon the means for supplying power to such equipment but also upon means for machine controlling the power supply apparatus. For example, many manufacturing operations are now controlled in large part by computer. This, of course, requires that some type of interfacing means be provided between the computer and the controlled apparatus in order that the machine language of the computer (typically in digital pulsed form) may be converted into a form suitable for providing the desired control function.

One prior art interfacing device is in the form of a variable auto transformer which is powered by a reversible stepping motor that can be directionally driven by the pulsed output of the computer. However, the auto transformer is typically expensive, quite large and requires a relatively long time to make a predictable change in power level. The auto transformer also requires several seconds to go from full on to full off making it unsuitable for use in processes requiring that an AC power level be switched "off" and "on" very rapidly. Thus, in applications wherein each of a number of stations are to be polled by the computer every few seconds, the limitations of the auto transformer make its use at least undesirable if not impractical. Controlled bidirectional current conducting semiconductors have now provided a more suitable solution to the problem of providing simple control over the delivery of the alternating current power. These semiconductors in the ungated state normally exhibit a high impedance characteristic between two main current carrying terminals. When a relatively low power triggering impulse is applied to a third or gate terminal, the device switches to a second state wherein a low impedance exists between the current carrying terminals. These semiconductor devices are bilateral in nature and permit current conduction in either direction with equal facility. Furthermore, the triggering impulses required to effect switching from a low to a high impedance state may generally be of either polarity. The bilateral characteristic of the main current conducting path and the flexibility offered by the permissible forms of triggering impulses render the bidirection current conducting semiconductors admirably suited for control of alternating current.

Several basic circuits utilizing such bidirectional current conducting semiconductors are disclosed in the U.S. Pat. to Howell, Ser. No. 3,346,744. These circuits, however, are not adapted for direct control by the output of a computer and must therefore be provided with an interfacing device of the type alluded to above in order to have utility in a modern computerized system.

OBJECTS OF THE PRESENT INVENTION

It is therefore a primary object of the present invention to provide a novel solid-state AC power control circuit which is adapted for direct control by a digital computer.

Another object of the present invention is to provide a novel AC power control apparatus which will respond to electrical signals of extremely short duration to change the power level up or down, or turn the power on or off.

Still another object of the present invention is to provide a novel AC power control apparatus including a pulse controlled regulating network for driving a bidirectional current conducting semiconductor device which acts as the AC power regulating means.

SUMMARY OF THE PRESENT INVENTION

The present invention relates to a solid-state AC power control circuit intended for use with digital computers. In a preferred embodiment, the circuit includes a field effect transistor, a unijunction transistor and an NPN transistor along with two storage capacitors and a plurality of relays which may be actuated by the output pulses of a digital computer to provide gating pulses to a triac which is used to regulate an alternating load current. The apparatus will increase or decrease AC power to a work load when grounding pulses are applied to the proper input terminal. The amount of power change is determined by the duration of the grounding signal and the RC time constant of a memory circuit in the device. AC power change to the work load with no input step is less than 2 percent per hour assuming that the AC line voltage is constant.

In addition to the power increase and decrease inputs, two other inputs are provided that will allow the controlled power to be turned full off or back on to a preset level without disturbing the memory circuit. The unit provides full isolation from the AC power line to all control inputs.

Other features of the present invention will become apparent to those skilled in the art after having read the following disclosure of a preferred embodiment which is illustrated in the several figures of the drawing.

IN THE DRAWING

FIG. 5 is a timing diagram showing the waveforms appearing at certain points in the circuit with approximately half-power being supplied to the load.

FIG. 6 is a timing diagram showing the waveforms appearing at certain points in the circuit with the power supplied to the load at near full on.

DETAILED DESCRIPTION OF A PREFERRED EMBODIMENT

Figure 1:
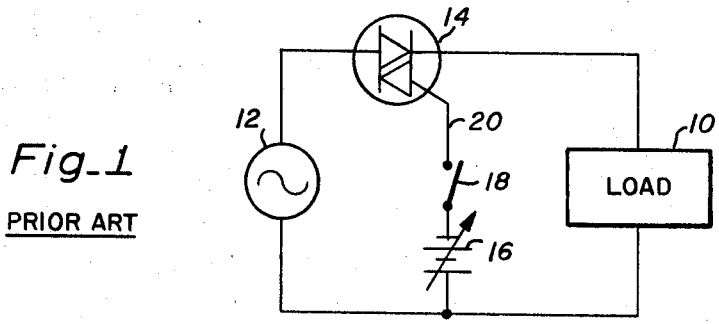
FIG. 1 is a simplified schematic diagram illustrating a prior art power control circuit employing a bidirectional current conducting semiconductor device.

Turning now to the drawing, there is shown in FIG. 1 a simplified prior art circuit, such as is described in the above identified Howell patent, for controlling the energization of a load 10 which is serially conducted to an AC power source 12 through a bidirectional semiconductor device 14. The semiconductor device 14 is of the type which normally exhibits a high impedance characteristic between its two main current carrying terminals, and a low impedance when a control signal of a predetermined amplitude is applied to a third terminal thereof. Devices of this type are now commonly called "triacs." A variable unidirectional supply source 16, depicted herein as a battery, may selectively be placed in circuit with the gating terminal 20 of the semiconductor device 14 by means of a mechanical switch 18 which may also include an electromechanical relay or circuit means which is capable of assuming a conductive or nonconductive state in response to a given input thereto.

When the output of the unidirectional potential source 16 is switched into circuit with the gating terminal 20 by closing the switch 18, the semiconductor device 14 is switched to its low impedance state and is thereby rendered conductive. The output of the AC source is thus fully applied across the load 10.

The magnitude of the unidirectional control signal applied at terminal 20 has to be of a sufficient amplitude to produce gating of the device 14 during both polarity half cycles of the output of the AC supply source 12 in order to insure symmetry in the current supplied to the load 10. The device 14 is gated into its conducting state at the time that the signal from the unidirectional potential source 16 is applied to its gating terminal and reverts to its blocking state after this control signal is removed and the current from source 12 attains the zero crossover point. This is to say that a pulse of duration less than the remainder of the half-cycle will cause the device to be turned on and it will remain on until the end of that half-cycle.

Figure 2:
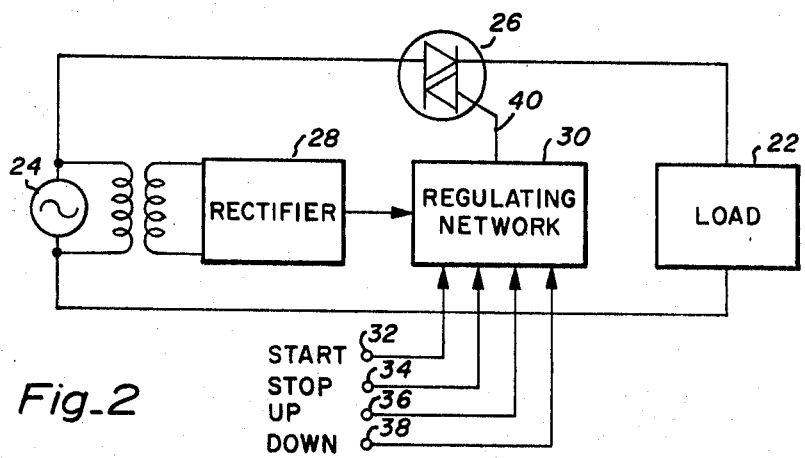
FIG. 2 is a simplified diagram of an AC power control device in accordance with the present invention.

Turning now to FIG. 2 of the drawing, a simplified control circuit in accordance with the present invention is illustrated. As in the prior art embodiment, a load 22 is energized by an AC source 24 through a bidirectional semiconductor power regulating device such as the triac 26. However, in this embodiment a rectifying means 28 is provided for converting AC power from the source 24 into DC power which can be used to control the bidirectional device 26. In addition, a regulating network 30 is provided which is responsive to input signals in the form of pulses applied to the terminals 32, 34, 36 and 38, for controlling the duration and voltage of the DC signal that is supplied to the gating terminal 40 of triac 26. The regulating network 30 is responsive to pulses of very short duration, i.e., in the millisecond range. Such pulses applied to the terminal 32 cause load 22 to be energized and pulses applied to terminal 34 cause the power supplied to the load 22 to be interrupted, while pulses applied to the terminal 36 cause the amount of power supplied to load 22 to be increased and pulses applied to terminal 38 cause the amount of power supplied to load 22 to be decreased. The regulating network 30 can thus be referred to as an interfacing means which allows the power control device 26 to be directly controlled by a digital computer or other machine having a pulsed output.

Figure 3:
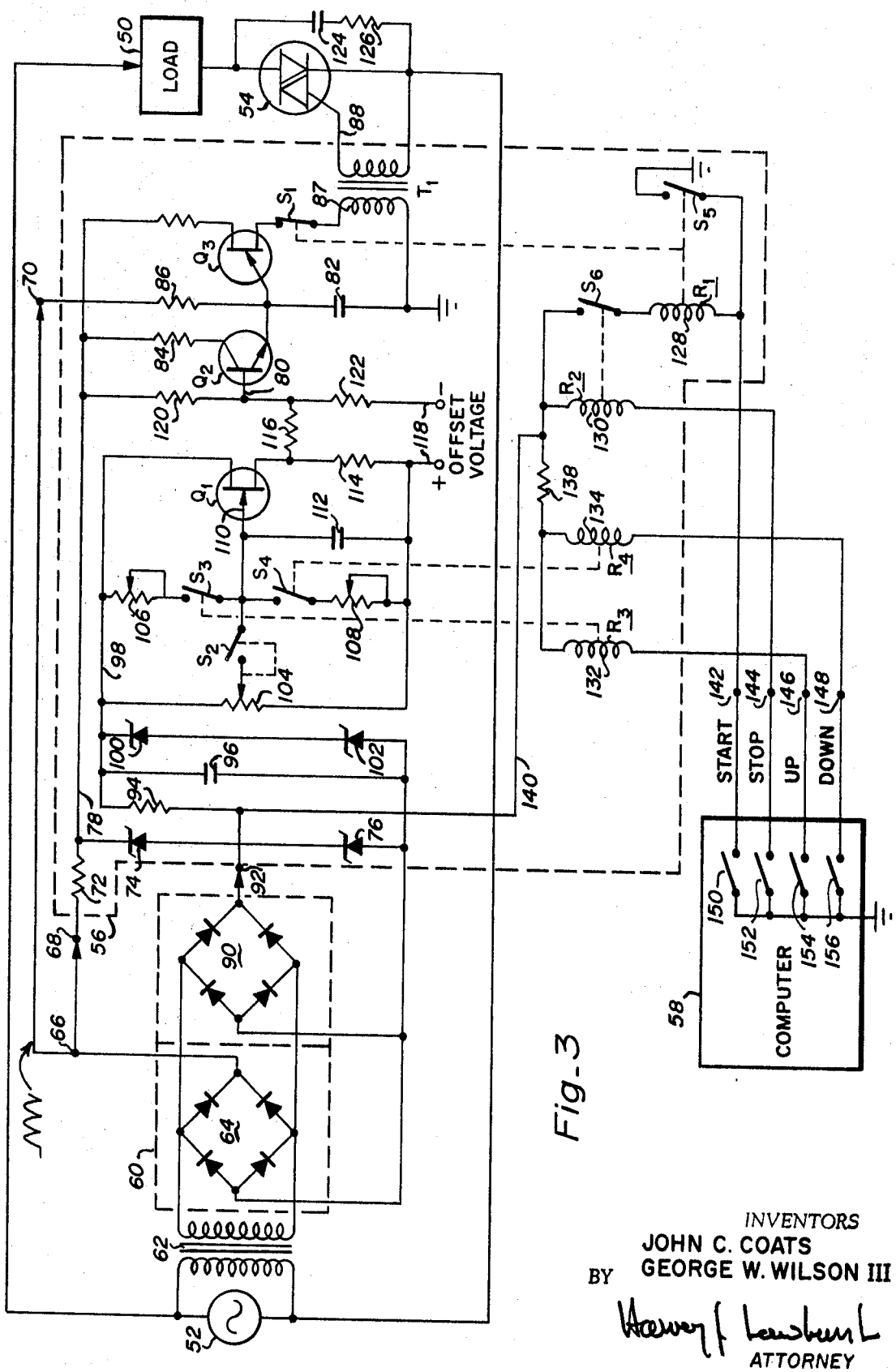
FIG. 3 is a detailed schematic of an AC power control circuit in accordance with a preferred embodiment of the present invention.

Referring now to FIG. 3, a detailed schematic of a preferred embodiment of the present invention will be described. As in the simplified embodiment previously disclosed, a load 50 is supplied with AC power from an AC source 52 and the amount of power supplied thereto is determined by the conductive state of a bidirectional semiconductor device 54. The control inputs to the device 54 are provided by a regulating network 56 in response to pulsed signals fed thereto by a computer 58 or other programmed control source. To provide full control of the device 54 by the network 56, the computer 58 must be capable of generating four outputs, i.e., start, stop, up and down.

In order to provide DC power to the regulating network 56, a dual rectifier 60 is provided which is coupled to the source 52 by a transformer 62. The first section includes a full-wave rectifier 64 which produces at terminal 66, full-wave rectified DC pulsating at a 120 cycle rate. This DC is then coupled into network 56 at the terminals 68 and 70. The DC introduced at terminal 68 is current limited by a resistance means 72 and is clipped by a pair of zener diodes 74 and 76 so that the voltage appearing on line 78 is full-wave rectified, unfiltered AC clipped at 13.8 volts. The voltage is used to energize the phase firing portion of the circuit which includes an NPN transistor $Q_2$ and a unijunction transistor $Q_3$.

The transistor $Q_2$ is arranged in an emitter follower configuration such that its conduction is governed by the bias appearing at its base 80. The conductive state of the transistor $Q_2$ controls a portion of the charging current supplied to a storage capacitor 82. When charging, the capacitor 82 draws current from line 78 through resistor 84 and $Q_2$ and also from terminal 70 through resistor 86. Therefore, a change in the control voltage at the base 80 of $Q_2$ produces, in effect, a change in the time required to charge the capacitor 82. Once capacitor 82 begins charging, it continues until it reaches the firing potential of the unijunction $Q_3$.

When $Q_3$ fires, capacitor 82 is discharged through $Q_3$, switch $S_1$ and the primary of transformer $T_1$ to ground. Since the potential input at terminal 70 is merely full-wave rectified DC pulsating at a 120 cycle rate, it will be seen that the firing potential of $Q_3$ will be reached every half-cycle if the amount of current allowed to pass through $Q_2$ is sufficient when added to that flowing through resistor 86 to cause the capacitor 82 to charge to the firing potential of $Q_3$ before the end of a given half cycle. Thus, the control voltage applied to the base 80 of $Q_2$ can change the point in each half cycle that $Q_3$ fires. Each time that $Q_3$ fires, a pulse of current is coupled through transformer $T_1$ to the gate 88 of the bidirectional semiconductor 54 which, as illustrated, is a triac. On receiving a pulse of sufficient amplitude at its gate 88, the triac 54 is rendered conductive and continues to conduct through the remainder of the half cycle. Any oscillations following the first pulse in each half cycle have no effect as the triac is latched until the end of that half cycle.

The second bridge rectifier 90 provides full-wave rectified DC for the control portion of the circuit and is introduced thereto at terminal 92. This current is passed through the current limiting resistor 94 and is filtered by a capacitor 96. A pair of Zener diodes 100 and 102 provide a 20 volt potential on the line 98. The control portion of the circuit includes potentiometers 104, 106 and 108 which may be coupled to the gate 110 of the FET $Q_1$ by the switches $S_2$, $S_3$ and $S_4$ as indicated. A capacitor 112, which serves as a memory storage element for the circuit, is also coupled to the gate 110 of FET $Q_1$.

With switches $S_2$ and $S_4$ open, the closing of switch $S_3$ causes capacitor 112 to be charged, by current flowing through resistor 106, to a voltage governed by the ohmic value of the resistor 106 and the length of the time that the switch $S_3$ is closed. Similarly, by opening $S_3$ and closing $S_4$, capacitor 112 will be discharged through the resistor 108 by an amount determined by the ohmic value of resistor 108 and the time that the switch $S_4$ is closed. The potentiometer 104 and switch $S_2$ provide a continuous gate bias to $Q_1$ for manual operation. Capacitor 112, the memory storage element is preferably an extremely low leakage tantalum electrolytic capacitor.

In order to sense the voltage stored on the capacitor 112 without providing a leakage discharge path, a high impedance voltage follower is required. The FET $Q_1$ which provides this function is coupled, as illustrated, in a source-follower configuration. The voltage following output is taken across a resistor 114 and is coupled into the base 80 of transistor $Q_2$ through a resistor 116. Offset voltages may be applied at the terminals 118 and used to provide adding or subtracting voltages to the appropriate points in the circuit. These voltages are used to boost, or pull up the operating range of the circuit into its most linear region. The minus offset may also be used to set the minimum "on" current of the device if a preset starting current is required. The plus offset may be used to limit the maximum current from the device. Alternatively, where no offset voltage is to be utilized, the terminals 118 may be grounded.

Transistor $Q_2$ is arranged in an emitter follower configuration and its conduction is governed by its base bias, i.e., the control voltage applied thereto from $Q_1$ via resistor 116. The resistors 120 and 122 are biasing resistors for transistor $Q_2$. As mentioned above, the state of conduction of transistor $Q_2$ determines a portion of the charging current provided to capacitor 82. Since the capacitor 82 is charged by the output of the rectifier 64, but through two separate parallel current paths, i.e., one providing a full-wave rectified unfiltered DC through resistor 86 and the other providing an unfiltered full-wave rectified AC voltage clipped at 13.8 volts fed through $Q_2$, a change in the control voltage at the base 80 of $Q_2$ produces, in effect, a change in the time required to charge capacitor 82 during each half cycle. However, because the voltage provided through resistor 86 is an unfiltered full-wave rectified DC pulsating at a 120 cycle rate, the firing of the UJT $Q_3$ will repeat every half cycle of the AC current supplied to load 50.

Each time $Q_3$ fires, the capacitor 82 is allowed to discharge through the primary 87 of transformer $T_1$ and couple an energizing pulse into the control gate of the triac 54 causing it to become conductive at that point in time. And due to the operative characteristics of the triac, it will continue to conduct throughout the remainder of that half cycle allowing power to be supplied to the load 50. The capacitor 124 and resistor 126 serve to protect triac 54 from transient voltage spikes.

In order to enable the switches $S_1$, $S_3$ and $S_4$ to be controlled by the electrical input signals, four very fast acting miniature reed relays 128, 130, 132 and 134 are provided as indicated in the drawing. One end of each of the relay windings is coupled to a circuit point 136 (the relay windings 132 and 134 are coupled thereto through a resistor 138). The circuit point 136 is directly coupled to output terminal 92 of rectifier 90 by the line 140 so as to provide an actuating potential for the respective windings. The other ends of the various windings are coupled to the input control terminals 142, 144, 146 and 148 respectively, as indicated.

The relay R1 is a double pole-double throw relay including the winding 128, switch $S_1$ and switch $S_5$. Relay R2 includes winding 130 and switch $S_6$. Relay R3 includes winding 132 and switch $S_3$, and relay R4 is comprised of winding 134 and switch $S_4$. Since one side of each of the actuating windings of the respective relays is coupled to the positive potential provided at point 136, it will be apparent that the relays can be selectively actuated by merely grounding the appropriate ones of the terminals 142 through 148. Since the outputs of a digital computer are of a form which can effectively provide grounding pulses to the control terminals, the regulating network of the present invention provides an effective interface for enabling the control apparatus to be directly coupled into the computer 58. For purposes of illustration, the operative function carried out by the computer 58 is illustrated by the grounding switches 150, 152, 154 and 156.

OPERATION

With the AC power source 52 coupled to the load 50 through the triac 54, no power will be provided to the load until a gating pulse is provided at the gate terminal 88 since the triac 54, in its nonconducting state, provides substantially open circuit impedance to the power circuit. However, since the rectifiers 64 and 90 are coupled to the source 52 through the transformer 62, they provide a continuous power input to the control circuit 56 at the terminals 68, 70 and 92. With all of the switches S except $S_6$ initially open, switch $S_6$ being normally closed, no gating input is initially provided to the gate 88 of triac 54 since the switch $S_1$ open circuits the primary of transformer $T_1$. On the application of a start pulse to the input terminal 142, which is for purposes of illustration effected by a closing of the computer grounding switch 150, the relay R1 is actuated causing switches $S_1$ and $S_5$ to close, with $S_5$ also grounding terminal 142 and serving to latch the relay R1 in its actuated state.

Figure 4:
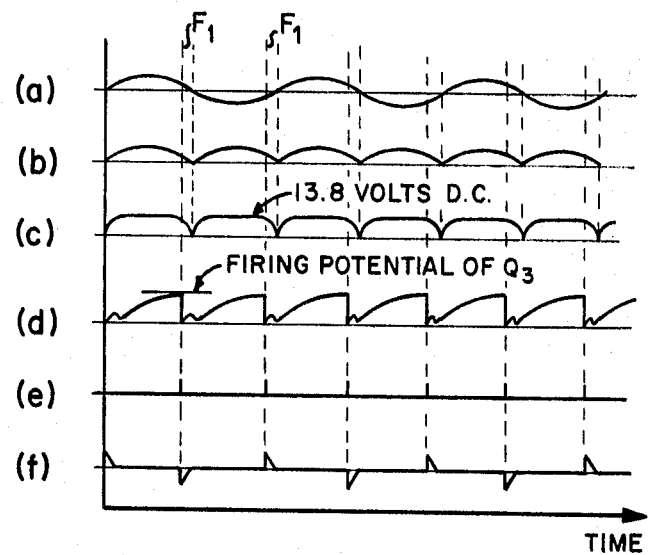
FIG. 4 is a timing diagram showing the waveforms appearing in certain parts of the circuit with the power being supplied to the load at near full off.

At this point reference is additionally made to FIG. 4 of the drawing wherein the voltages appearing at point 70 and 78, as indicated by the curves (b) and (c) respectively, may be compared to the output waveform of the power source 52 as indicated in part (a). Assuming that prior to the actuation of relay R1, a small charge is retained on memory capacitor 112, the transistor $Q_2$ will, through the action of FET $Q_1$, be biased in accordance therewith and will cause the capacitor 82 to be charged at a rate such that the firing potential of $Q_3$ will be reached at a time $F_1$ late in each half cycle of the power waveform.

The charging rate of the capacitor 82 is indicated in part (d) of FIG. 4. When the capacitor 82 has charged to the firing potential of UJT $Q_3$, it will discharge through $Q_3$ causing a pulse of current to be passed through the primary winding 87 of transformer $T_1$. These pulses, each occurring at the same time in each half cycle as indicated in part (e) of FIG. 4, are coupled through transformer $T_1$ and applied to the gate 88 of the triac 54 causing it to immediately become conductive and remain conductive until the end of that half cycle at which time it reverts to its nonconductive state. In part (f) of FIG. 4, the effect of this gating action is indicated and as illustrated, the only power supplied to the load during each half cycle is that which occurs between the firing times $F_1$ and the end of that particular half cycle.

Looking now to FIG. 5 of the drawing, curves corresponding to those illustrated in FIG. 4 are shown wherein the triac 54 is being fired at the midpoint of each half cycle so as to cause the load 50 to be energized with half of the available power supplied by the source 52. This increase in power is effected in response to actuating signals applied to the up terminal 146. These signals are in the form of grounding pulses which actuate the relay R3 causing the switch $S_3$ to be intermittently closed and opened until capacitor 112 has been allowed to charge up to a predetermined value. As this occurs, the base drive of transistor $Q_2$ is caused to follow the charge on capacitor 112 and thus becomes more conductive allowing more current to flow therethrough to accelerate the cyclical charging of capacitor 82 of the phase firing circuit. As soon (after the beginning of each half cycle) as capacitor 82 reaches the firing potential of UJT $Q_3$, it will be discharged through winding 87 causing triac 54 to be energized to provide half the available power to load 50.

Referring to part (d) of FIG. 5, it will be noted that the capacitor 82 is caused to discharged three times during each half cycle at this particular power setting so as to produce three firing pulses at the gate 88 of the triac 54. Although the discharges following the first discharge of each half cycle will produce a trigger pulse at gate 88 these trigger pulses have no effect as the triac is latched for the remainder of each half cycle following the first trigger pulse of that half cycle. Thus, as indicated in part (f) of FIG. 5, the triac 54 will be fired at $F_2$ during each half cycle and will cause approximately 50 percent of the available power to be provided to the load 50.

In FIG. 6, the waveforms of the signals appearing in the circuit at points corresponding to those of the waveforms of FIGS. 4 and 5 are illustrated for the case where the power supplied to the load 50 is near full on. Note the coincidence of the first firing pulse in each half cycle and the start of conduction at $F_3$. Again, the pulses following the first pulse of each half cycle have no effect on the triac 54. It should also be noted that at this power level the envelope E of the curve shown in part (d) of FIG. 6 follows the clipped full-wave supply voltage which occurs on line 78. This increase in power supplied to the load is obtained by causing the "up" switch $S_3$ to be additionally opened and closed to further charge memory capacitor 112 thus further "opening" the charge path for capacitor 82 through transistor $Q_2$ and causing the triac 54 to be fired earlier in each half cycle.

Similarly, the power supplied to the load 50 could be reduced to any desired power setting by applying grounding pulses to the "down" terminal 148 so as to cause switch $S_4$ to be intermittently closed and opened to partially discharge capacitor 112. As the charge on capacitor 112 is reduced the base drive to $Q_2$ is correspondingly reduced so as to close the charging path of capacitor 82 through $Q_2$. This causes a reduction in the charging rate of capacitor 82 so that it reaches the firing potential of UJT $Q_3$ at a later time during each half cycle, thus effectively reducing the power supplied to the load 50.

As mentioned previously, an input to the "stop" terminal 144 will actuate relay R2 to open switch $S_6$ which deactivates relay R1 to open switch $S_1$ which open-circuits the actuating circuit of triac 54 rendering it nonconductive so that no power is supplied to the load 50.

Although a single preferred embodiment of the present invention has been described above, it is contemplated that many alterations and modifications of the invention will become apparent to those skilled in the art and it is to be understood that this description of preferred embodiments is for purpose of illustration only and is in no manner intended to be limiting in any way. Accordingly, it is intended that the appended claims be interpreted as covering all modifications which fall within the true spirit and scope of the invention.

What we claim is:

1. Circuit means for supplying energizing pulses to a bidirectional semiconductor device used to regulate AC power supplied by an AC power supply to a load, comprising:
   a plurality of input terminals;
   an output terminal to which a control electrode of the semiconductor device is coupled;
   potential storage means providing a variable power and operator to provide
   rectifier means responsive to the AC power and operative to provide a pair of DC potentials;
   switching means responsive to input signals applied to said input terminals and operative to selectively couple one of said DC potentials to said potential storage means to change said reference potential; and
   phase firing circuit means including a capacitor and a pair of electrical circuits for individually coupling said DC potentials to said capacitor, one of said electrical circuits including a variable impedance device responsive to said reference potential and operative to control the time required to charge said capacitor to the firing potential of said phase firing circuit means, said phase firing circuit means providing energizing pulses to said output terminal each time said firing potential is reached.

2. A load energizing circuit, comprising:
   an AC power supply for providing an alternating current;
   a bidirectional semiconductor device responsive to a firing signal and operative to couple said alternating current to the load;
   control circuit means responsive to a first input signal and a second input signal and operative to develop a control potential having a magnitude determined by said first and second input signals, said control circuit means including a memory device for maintaining said control potential substantially constant until it is changed by one of said first and second input signals; and
   a phase firing circuit means responsive to said control potential and operative to develop said firing signal at a time following the beginning of each half cycle of said alternating current, said time being determined by the magnitude of said control potential.

3. A load energizing circuit as recited in claim 2 wherein said memory device includes a capacitor, and said control circuit means further includes a capacitor charging means responsive to said first input signal and operative to charge said capacitor, and a capacitor discharging means responsive to said second input signal and operative to discharge said capacitor.

4. A load energizing circuit as recited in claim 3 and further comprising an enabling means responsive to a third input signal and operative to enable said phase firing circuit means, and a disabling means responsive to a fourth input signal and operative to disable said phase firing circuit means.

5. A load energizing circuit as recited in claim 2 and further comprising an enabling means responsive to a third input signal and operative to enable said phase firing circuit means, and a disabling means responsive to a fourth input signal and operative to disable said phase firing circuit means.

6. In a load energizing circuit including means for generating an alternating current, a bidirectional semiconductor device for coupling the alternating current to the load, and a regulating network for controlling the actuation of the semiconductor device, an improved regulating network comprising:
   control circuit means responsive to a first input signal and a second input signal and operative to develop a control potential having a magnitude determined by said first and second input signals, said control circuit means including a potential storage device for maintaining said control potential substantially constant until changed by one of said first and second input signals; and
   a phase firing circuit means responsive to said control potential and operative to develop a firing signal for actuating the semiconductor device at times following the beginning of each half cycle of the alternating current, such times being determined by the magnitude of said control potential.

7. In a load energizing circuit as recited in claim 6 wherein said potential storage device includes a capacitor, and said control circuit means further includes a capacitor charging means responsive to said first input signal and operative to charge said capacitor, and a capacitor discharging means responsive to said second input signal and operative to discharge said capacitor.

8. In a load energizing circuit as recited in claim 7 and further comprising a first switching means responsive to a third input signal and operative to enable said phase firing circuit means, and a second switching means responsive to a fourth input signal and operative to disable said phase firing circuit means.

9. In a load energizing circuit as recited in claim 6 and further including an enabling means responsive to a third input signal and operative to enable said phase firing circuit means, and a disabling means responsive to a fourth input signal and operative to disable said phase firing circuit means.

10. In a load energizing circuit as recited in claim 6 and further comprising a full-wave rectifier means responsive to said alternating current and operative to develop a filtered DC current and an unfiltered DC current; said phase firing circuit means including a capacitor, a first electrical circuit responsive to said control potential and operative to couple said filtered DC current to said capacitor, and a second electrical circuit operative to couple said unfiltered DC current to said capacitor.